United States Patent
Taylor

[11] Patent Number: 6,164,436
[45] Date of Patent: Dec. 26, 2000

[54] CONVEYOR

[75] Inventor: Alfred Taylor, Sydney, Australia

[73] Assignee: TNA Australia PTY, Limited, Chester Hill, Australia

[21] Appl. No.: 09/207,565

[22] Filed: Dec. 8, 1998

[30] Foreign Application Priority Data

Dec. 12, 1997 [AU] Australia .................................. PP0939

[51] Int. Cl.⁷ ........................... B65G 47/31; B65G 17/46
[52] U.S. Cl. ..................................... 198/689.1; 198/419.2
[58] Field of Search .............................. 198/689.1, 419.2

[56] References Cited

U.S. PATENT DOCUMENTS

| | | | |
|---|---|---|---|
| 3,675,761 | 7/1972 | Hall | 198/184 |
| 3,958,683 | 5/1976 | Schregenberger | 198/689.1 |
| 4,142,624 | 3/1979 | Diver et al. | 198/419.2 |
| 4,620,826 | 11/1986 | Rubio et al. | 414/73 |
| 4,670,935 | 6/1987 | Bowler | 198/689.1 |
| 4,690,269 | 9/1987 | Takao | 198/419.2 |
| 4,815,581 | 3/1989 | Deutschlander | 198/689.1 |

FOREIGN PATENT DOCUMENTS

| | | |
|---|---|---|
| 0121961 | 10/1984 | European Pat. Off. . |
| 0276949 | 8/1988 | European Pat. Off. . |
| 4200999 | 8/1992 | Germany . |
| 2212127 | 7/1989 | United Kingdom . |

*Primary Examiner*—Joseph E. Valenza
*Assistant Examiner*—Mark A. Deuble
*Attorney, Agent, or Firm*—Ladas and Parry

[57] ABSTRACT

A conveyor assembly (15) which receives bags (13) from a packaging machine (10). The assembly (15) includes a first conveyor (16) which delivers the bags (13) to a second conveyor (17). The conveyors (16 and 17) employ plenum members (18 and 30) which apply an area of reduced air pressure to the bags (13) to urge the bags (13) into contact with conveyor belts (21 and 35). The packages (13) are located below the conveyors (16 and 17) so as to depend therefrom. The relative speed of the conveyors (16 and 17) is governed so that the bags (13) are arranged in separated sets (39) on the conveyor (17).

12 Claims, 3 Drawing Sheets

CONVEYOR

TECHNICAL FIELD

The present invention relates to conveyors and more particularly but not exclusively to conveyors which transport packages, such as packages containing a food product.

BACKGROUND OF THE INVENTION

Described in U.S. Pat. Nos. 3,850,780 and 4,663,917 are packaging machines which receive a product, deliver the product into a tubular bag material and then sever portions of the tubular bag material to form sealing closed bags of product. More particularly, the machine of U.S. Pat. No. 4,663,917 is suited to packaging snack foods, such as potato crisps.

The above mentioned U.S.A. patent specifications describe packaging machines which employ opposing pairs of sealing jaws which engage the tubular bag material to form a seal and then subsequently sever the formed bags from the tubular bag material. The bags are allowed to fall from the sealing jaws to a chute for delivery to a conveyor upon which the bags rest. The bags are conveyed past a checking station at which workers inspect the bags, to determine for example whether the bags have been correctly sealingly closed. From there the bags are delivered to a packing station whereat workers pick up the bags and place the bags in boxes or larger bags for transportation purposes. Frequently inspection and packing take place at the one station.

The above discussed methods of packing the bags in boxes or larger bags is labour intensive and therefore expensive. Still further, the bags arrive at the packing station in a random manner and orientation.

OBJECT OF THE INVENTION

It is the object of the present invention to overcome or substantially ameliorate the above disadvantages.

SUMMARY OF THE INVENTION

There is disclosed herein a conveyor having:

a plenum member with an apertured portion, the plenum member in use having a reduced internal air pressure relative to air pressure outside the plenum member; and a conveyor belt passing adjacent the apertured portion of the plenum member, the belt having apertures which communicate with an aperture of the apertured portion so that items being carried by the conveyor are urged into engagement with the belt by the difference in air pressure between the interior and exterior of the plenum member.

Preferably, the apertured portion is facing downwardly together with the belt adjacent the apertured portion so that the items being conveyed are beneath the belt adjacent the apertured portion.

There is further disclosed herein a method of conveying items to be packaged, said method including the steps of:

providing a stream of said items;

providing a conveyor to receive the items at a first location to be conveyed to a second location;

applying to the items via the conveyor an area of reduced air pressures to create a force urging the items into contact with the conveyor; and releasing the items at said second location.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENT

Figure 1:
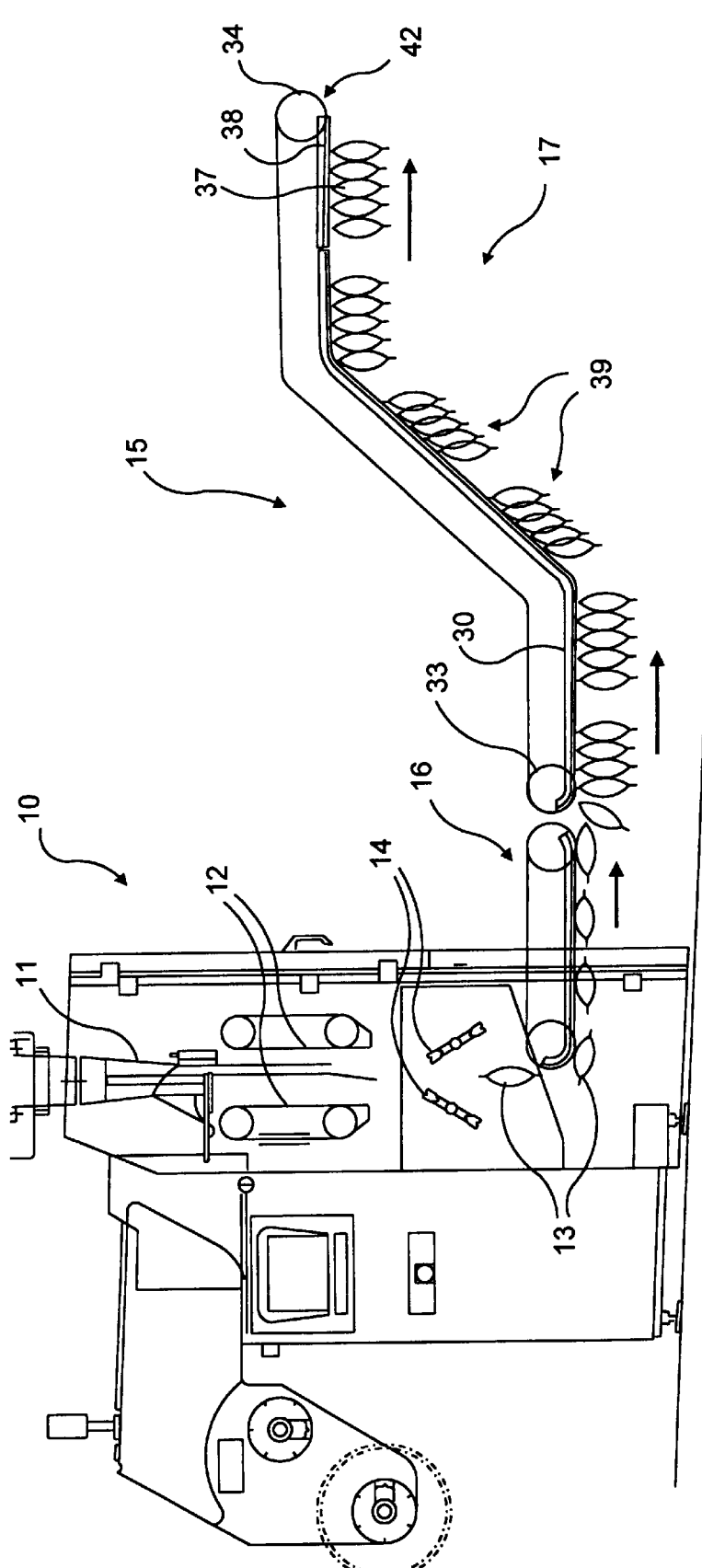
FIG. 1 is a schematic side elevation of a packaging machine and associated conveyor.
Figure 2:
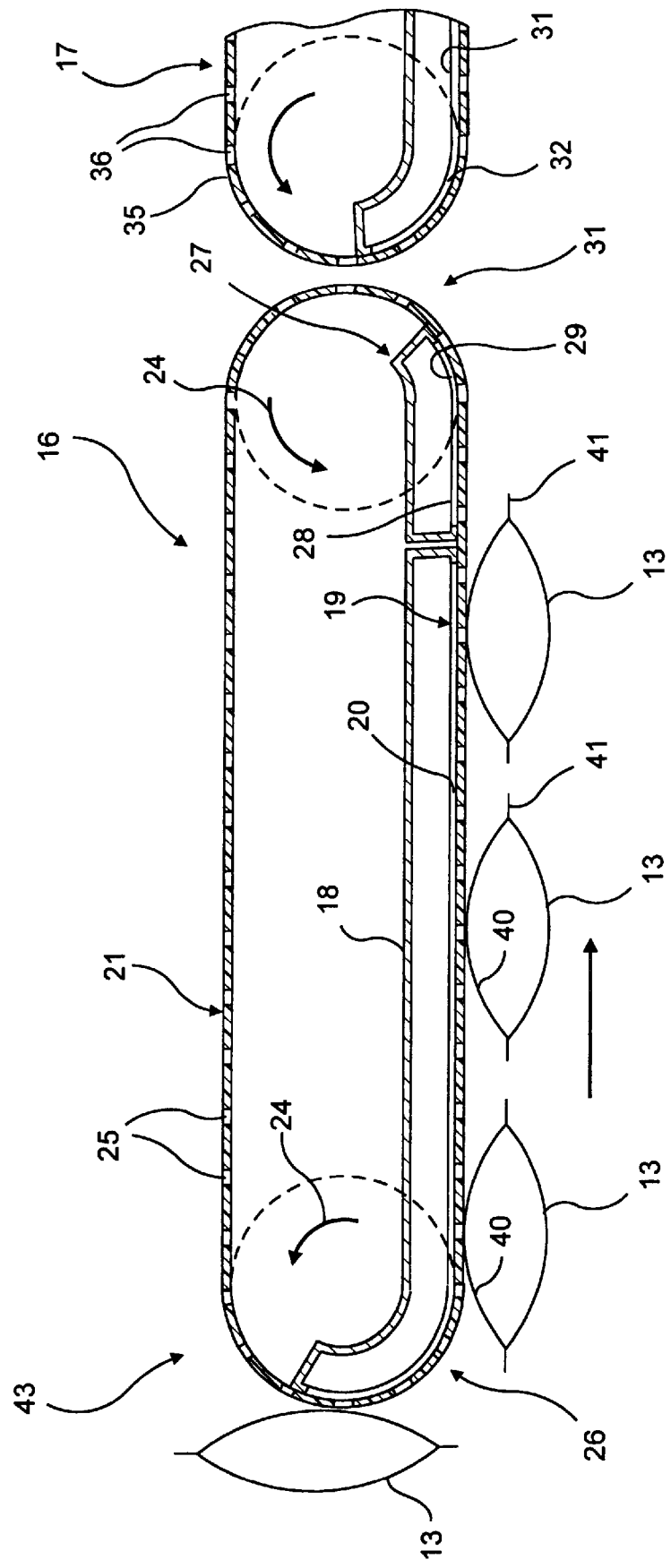
FIG. 2 is an enlarged view of a portion of the conveyor of FIG. 1.
Figure 3:
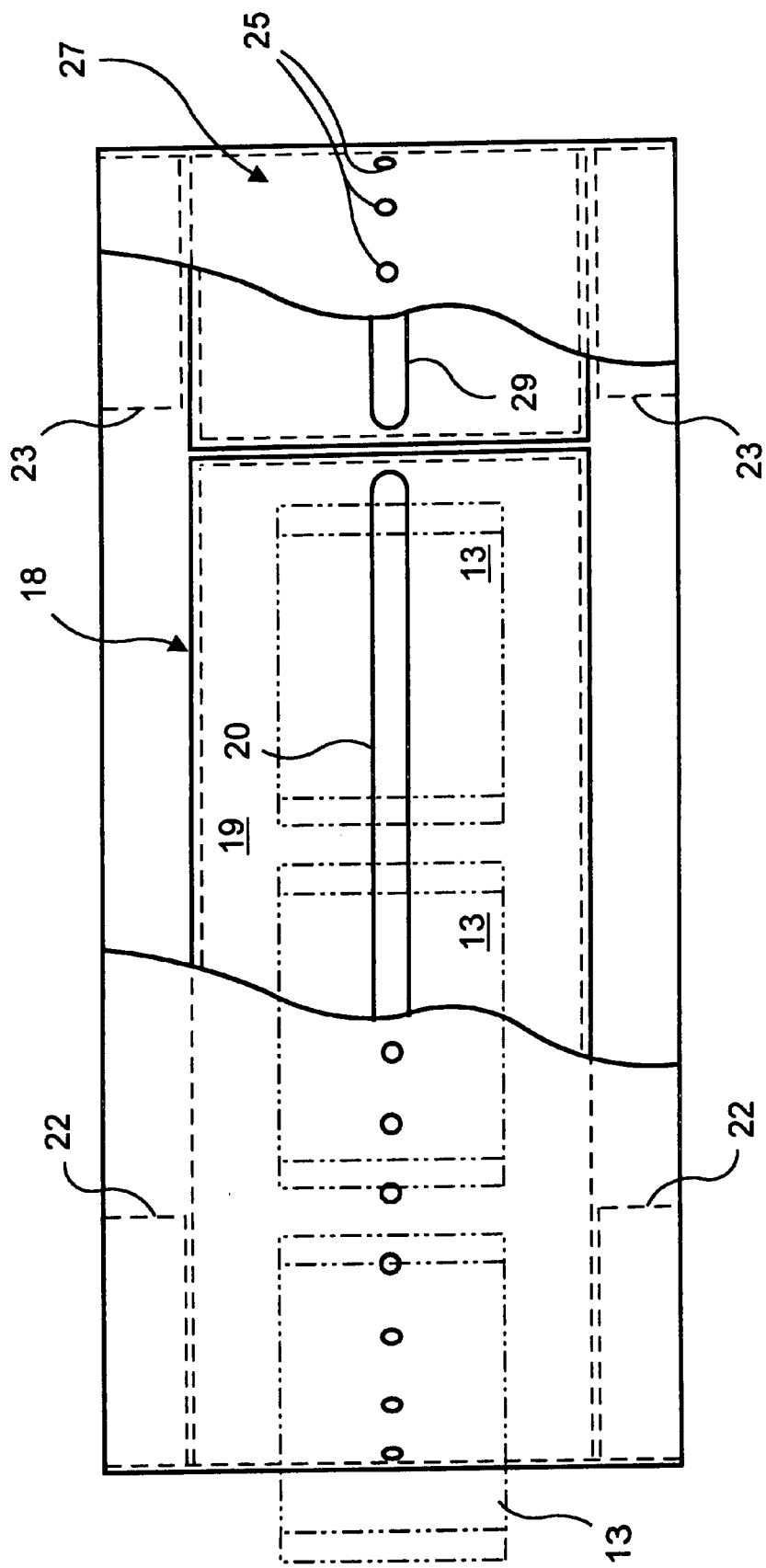
FIG. 3 is a schematic top plan view of the conveyor as illustrated in FIG. 2.

In the accompanying drawings there is schematically depicted a packaging machine 10, which can be the packaging machine of U.S. Pat. No 4,663,917. The packaging machine 10 has a product delivery chute 11 through which product is delivered to the interior of tubular bag material moved through the packaging machine 10 by drive belts 12. Individual bags 13 are formed by rotatably driven jaws 14, which form seals at the ends of each bag 13 and sever each bag 13 from the tubular bag material.

The bags 13 are engaged and transported by a conveyor assembly 15 from a receiving end 43 to a delivery end 44. The conveyor assembly 15 includes a first conveyor 16. The conveyor 16 engages the bags 13 as they leave the jaws 14 and transports the bags 13 to a second conveyor 17.

The conveyor 16 includes a first plenum member 18 which is connected to a means of reducing the air pressure within the plenum member 18. The plenum member 18 has an apertured portion 19 in the form of a downwardly facing plate with at least one longitudinally extending aperture (slot) 20.

A conveyor belt 21 passes between two pairs of rollers 22 and 23 of which at least one pair is driven so that the rollers 22 and 23 rotate in the direction of the arrows 24.

The belt 21 has a plurality of apertures 25 which are arranged in a row so that when passing the plate 20, they communicate with the slot 20. It should be particularly noted that the plenum member 18 has a curved portion 26 which includes a portion of the plate 19 and slot 20.

The conveyor 16 includes a second plenum member 27. However, it should be appreciated that in one construction the plenum member 18 may merely extend to be adjacent to the rollers 23 so that a plenum member 27 is not required. However, in this embodiment the plenum member 27 is provided and is independently reduced in internal pressure. The plenum member 27 has a plate 28 passed by the belt 21, with the plate 28 having at least one longitudinal slot 29. The apertures 25 pass longitudinally of the slot 29.

The conveyor 16 has its receiving end 43 adjacent to where the bags 13 are initially released by the sealing jaws 14. The bags 13 engage the end 43 and in particular are drawn into contact with the belt 21 due to the difference in pressure existing across the belt 25 as a result of a reduction in pressure internally of the plenum member 18. Each bag 13 will engage the belt 21 and close off one or more of the apertures 25 and therefore have air pressure exert a force on the bag 13 to pull it into contact with the belt 21 so that the bags 13 depend from the belt 27 adjacent to the apertured portion 19. Movement of the belt 21 will then convey the packages to the end 31 of the conveyor 16. If so required air pressure within the plenum member 27 may be varied and in particular may be governed so as to fluctuate. For example, initially a bag may be drawn into contact with the belt 22 as it passes the plenum member 27 up until the package 13 approaches the conveyor 17. At an appropriate time the pressure differential may be reduced to zero or as a further alternative may be raised above the surrounding air pressure so that the bag 13 adjacent to the plate 28 is ejected from the conveyor 16. As a further example, the conveyor 16 may be associated with a mechanism which detects defective bags 13. The defective bags 13 could then be ejected from the conveyor assembly 15 by increasing the pressure in the plenum member 27 so that the bag 13 located thereat is rejected and not passed to the conveyor 17. The conveyor 17 would then be controlled to compensate for the loss of the defective bag 13 in forming sets 39 of bags 13.

In the above described preferred embodiment the belt 21 is continuously driven past a location at which the bags 13 are released by the jaws 14 so that collection of the bags 13 by the assembly 15 is not intermittent.

The conveyor 17 is similar in construction to the conveyor 16 in that a first plenum member 30 is provided, which plenum member 30 has a downwardly facing apertured plate 40, provided with at least one longitudinally extending slot 32. Extending between pairs of rollers 33 and 34 is a belt 35 provided with a row of apertures 36. The apertures 36 pass longitudinally adjacent to the slot 32. A second plenum member 37 is also provided. The plenum member 37 has an aperture plate 38 provided with a longitudinally extending groove which communicates with the row of apertures 36.

The plenum member 30 is provided with reduced pressure so that bags 13 are urged into contact with the belt 35 due to the pressure differential between the interior of the plenum member 30 and the exterior. The bags 13 would cover at least one of the apertures 36 so as to be urged into contact with the belt 35 so as to depend therefrom. The plenum member 38 may be provided with the same pressure as the plenum member 30 or alternatively may be pulsed so as to have no pressure differential or alternatively a positive pressure differential to eject the bags 13 from the conveyor 17.

At least one of the pairs of rollers 33 or 34 is driven. The belt 35 is intermittently driven so that the bags 13 are arranged in sets of a predetermined number, with the belt accelerating and decelerating to provide a gap between the bag sets 39. The gap being larger than the space between adjacent bags 13 of each set 30 so that the sets can be distinguished. Preferably, the conveyors 16 and 17 would be arranged so that the bags 13 when delivered to the conveyor 17, are oriented generally vertically so as to depend from the belt 35. To do this the upper portion of the bag would need to be drawn into contact with the belt 17 so that at least one of the apertures 36 was covered by the bag 13.

The conveyor 16 engages the bags 13 so as to maintain them in a predetermined orientation. As the bags 13 pass the plate 19, they are maintained in a generally horizontal orientation. That is, the belt 21 engages a side wall 40 of each bag 13. This facilitates transfer of the bags 13 to the conveyor 17 which engages the leading end 41 of each bag 13. By engaging the leading end 41, the bags depend from the belt 35 so as to be oriented generally vertically. They therefore arrive at the end 42 of the conveyor 17 in sets of a predetermined number and at regular intervals and in a predetermined orientation. This greatly facilitates packaging into boxes and larger bags.

What is claimed is:

1. A conveyor assembly comprising:
   a first conveyor including:
   a plenum member having a reduced internal air pressure and a downwardly facing apertured portion with at least one aperture; and
   a conveyor belt passing adjacently below the apertured portion, the belt having apertures which communicate with at least one aperture of said apertured portion so that bags conveyed by the belt depend therefrom and are urged by air pressure into contact with the belt by at least partly covering at least one of the apertures of the belt when in communication with at least one aperture of the plenum member;

a second conveyor located adjacent to the first conveyor to receive the bags therefrom, the bags being arranged on the second conveyor in spaced batches, the second conveyor including;
   a plenum member having a reduced internal air pressure, the plenum member having a downwardly facing apertured portion with at least one aperture; and
   a conveyor belt passing adjacently below the apertured portion of the plenum member of the second conveyor, the belt of the second conveyor having apertures which communicate with at least one aperture of the apertured portion of the plenum member of the second conveyor so that bags conveyed by the belt of the second conveyor depend therefrom and are urged by air pressure into contact with the belt of the second conveyor when in communication with at least one aperture of the apertured portion of the plenum member of the second conveyor.

2. The conveyor assembly of claim 1, wherein said first conveyor further includes a pair of rollers between which the belt of the first conveyor passes from a bag receiving end to a bag delivery end, and the apertured portion of the first conveyor includes a curved end portion adjacent to said receiving end of the first conveyor so that the bags are engaged by the belt of the first conveyor adjacent to said curved end portion.

3. The conveyor assembly of claim 2, wherein the second conveyor further includes a pair of rollers between which the belt of the second conveyor passes from a bag receiving end to a position remote therefrom, and the apertured portion of the second conveyor includes a curved end portion adjacent to the receiving end of said second conveyor so that bags are engaged by the belt of the second conveyor adjacent to the curved end portion of the second conveyor.

4. The conveyor assembly of claim 3, wherein said conveyor belt of the second conveyor is intermittently driven to provide spacing between the apertures of the conveyor belt of the second conveyor at which the bags are received from the first belt so that the bags are transported horizontally by said first belt and vertically by said second belt.

5. The conveyor assembly of claim 1, wherein each apertured portion of said first and second conveyors includes a slot providing an aperture extending longitudinally parallel to the associated belt, and each belt is provided with a plurality of said apertures which move into alignment with the slot of the associated belt so that the bags are urged into engagement with the associated belt.

6. The conveyor assembly of claim 1 wherein:
   the first conveyor plenum member is a first plenum member; and
   said first conveyor further includes a second plenum member having an apertured portion to communicate with the apertures of the conveyor belt of the first conveyor so that bags pass from adjacent to said first plenum member, to adjacent to said second plenum member to be transferred therefrom to said second conveyor; and wherein:
   air pressure in said second plenum member is varied so that initially air pressure urges an adjacent one of the bags into contact with the first belt and is subsequently increased to facilitate transfer of said adjacent one of the bags to said conveyor belt of said second conveyor.

7. A method of conveying bags to be packaged, said method comprising the steps of:

providing a stream of said bags;

suspending the bags from a first conveyor which conveys the bags from a receiving location to a delivery location, the bags being urged into contact with the conveyor by air pressure;

delivering the bags from said delivery end to a second conveyor;

suspending the bags from the second conveyor and conveying the bags from a receiving end of the second conveyor, at which the bags are received from the delivery end of the first conveyor, to a delivery position at which the bags are removed from the second conveyor, the bags being urged into contact with the second conveyor by air pressure; and wherein the speed of the first and second conveyors arrange the bags on the second conveyor so that the bags are located at spaced intervals in spaced sets, with the spacing between adjacent sets being greater than the spacing between bags within each set.

8. The method of claim 7, wherein the second conveyor is accelerated and decelerated to provide the spacing between adjacent sets.

9. The method of claim 7, wherein the bags are arranged generally horizontally when engaged with the first conveyor by having a side wall of each bag being urged into engagement therewith, and each bag has an end portion engaged with the second conveyor so as to be suspended vertically therefrom.

10. The method of claim 7, wherein the bags are subjected to a variation in air pressure at the delivery end of said first conveyor to aid in removal of the bags from the first conveyor.

11. The method of claim 10, wherein defective bags are released from the delivery end of the first conveyor by reducing the air pressure.

12. The method of claim 10, wherein transfer of bags from the first conveyor to the second conveyor is facilitated by reducing air pressure urging the bags into contact with the first conveyor at said delivery end of said first conveyor.

* * * * *